W. E. ANDERSEN.
AUTOMOBILE LAMP CONTROL.
APPLICATION FILED APR. 26, 1910.
982,112.
Patented Jan. 17, 1911.
2 SHEETS—SHEET 1.
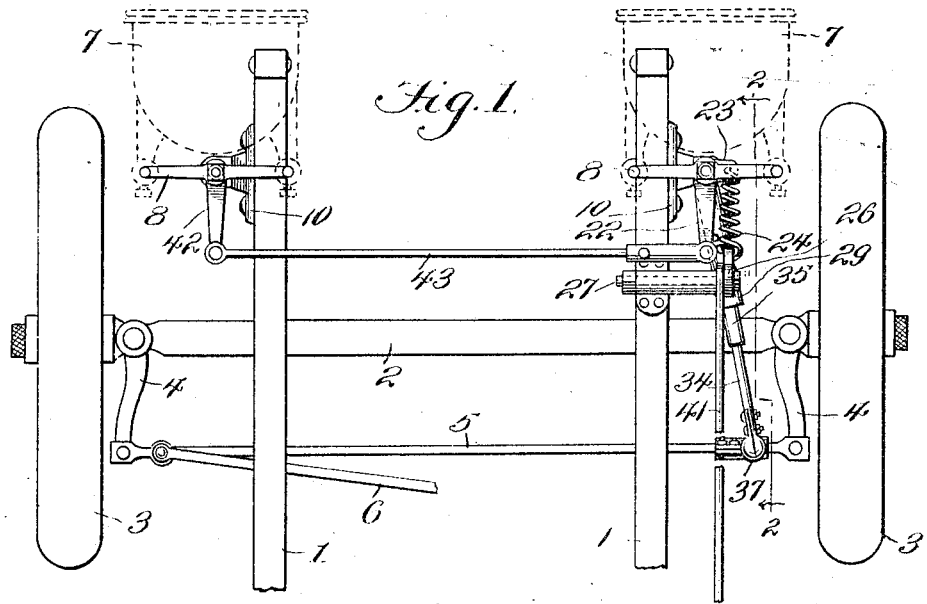
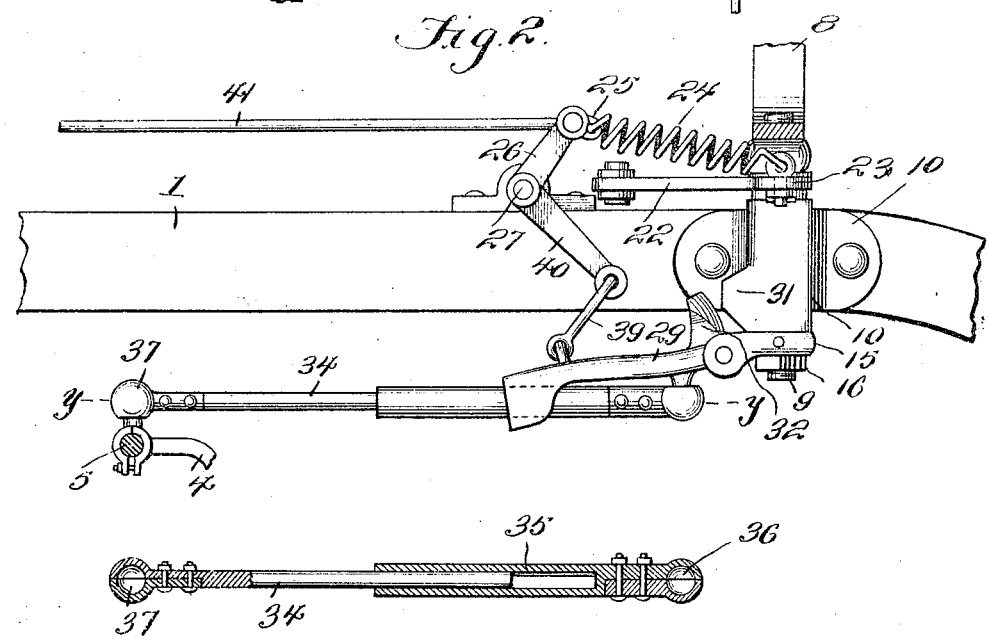
Witnesses
J. F. L. Wright
V. B. Hillyard
Inventor
Wilford E. Andersen,
By Victor J. Evans,
Attorney W. E. ANDERSEN.
AUTOMOBILE LAMP CONTROL.
APPLICATION FILED APR. 26, 1910.
982,112.
Patented Jan. 17, 1911.
2 SHEETS—SHEET 2.
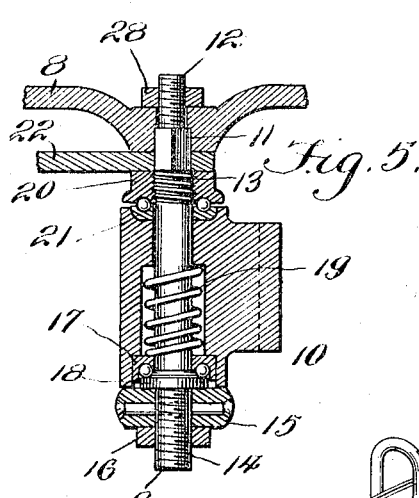
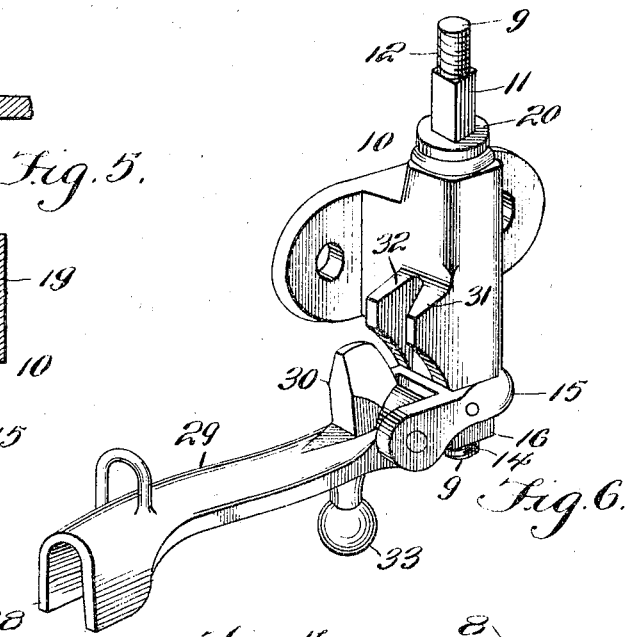
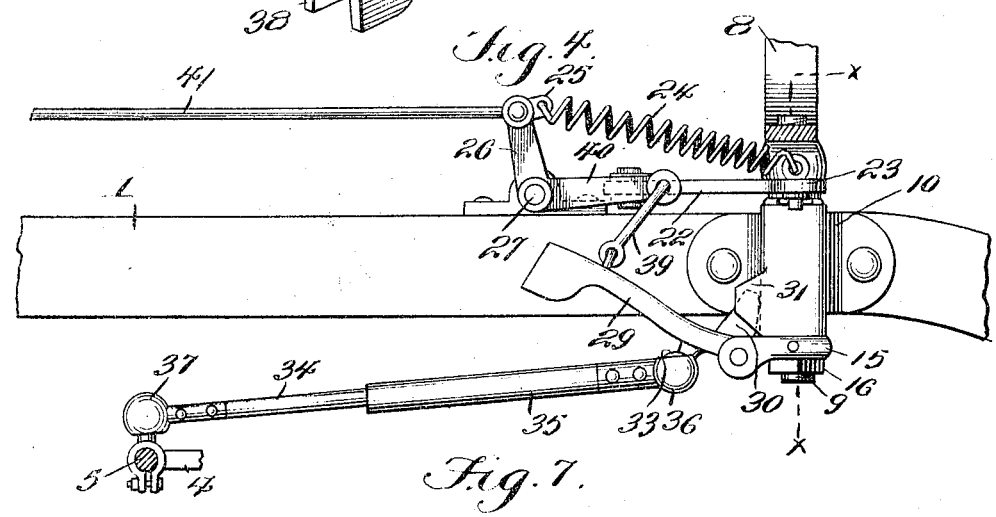
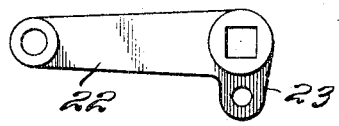
Witnesses
J. L. Wright
V. B. Hillyard
Inventor
Wilford E. Andersen
By Victor J. Evans,
Attorney

UNITED STATES PATENT OFFICE.

WILFORD E. ANDERSEN, OF IMBLER, OREGON.

AUTOMOBILE LAMP CONTROL.

982,112. Specification of Letters Patent. Patented Jan. 17, 1911.

Application filed April 26, 1910. Serial No. 557,735.

*To all whom it may concern:*

Be it known that I, WILFORD E. ANDERSEN, a citizen of the United States residing at Imbler, in the county of Union and State of Oregon, have invented new and useful Improvements in an Automobile Lamp Control, of which the following is a specification.

Mechanically propelled road machines are generally equipped with headlights for illuminating the roadway after nightfall and these headlights are generally fixedly mounted and as a consequence do not light up the roadway in advance of the machine when making sharp turns or rounding curves or corners. It is desirable to mount the headlights of mechanically propelled machines so that when turning corners or rounding curves the light may be directed so as to illuminate the roadway in advance of the machine, thereby avoiding accidents either from running into pedestrians or vehicles or from dropping into ruts or dangerous depressions in the roadway.

The present invention provides means whereby the headlights of automobiles and kindred machines are mounted so as to move simultaneously with the steering wheels to throw the light in the contemplated course of the machine, whether straight ahead or around curves or when turning, the mechanism whereby the lamps or headlights are controlled being of such construction as to be thrown into or out of action, so that when required the headlights may be held stationary or may be permitted to move with the steering mechanism.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a top plan view of the front portion of the running gear or chassis of an automobile provided with headlights mounted in accordance with the present invention. Fig. 2 is a sectional view on the line 2—2 of Fig. 1, looking to the left, as indicated by the arrows. Fig. 3 is a longitudinal section of the telescoping connection between the latch and the steering knuckle's connecting rod. Fig. 4 is a view similar to Fig. 2, showing the relation of the parts when the latch is released from the telescoping connection and in locking engagement with the lamp bracket bearing. Fig. 5 is a detail section on the line x—x of Fig. 4, looking to the right. Fig. 6 is a detail perspective view of the lamp bearing bracket, the latch and adjunctive parts, showing the same on a larger scale. Fig. 7 is a top plan view of the arm connecting the lamp bracket's connecting rod with the operating shaft to which one of the lamp brackets is attached and to which the latch is directly connected by means of a support.

Corresponding and like parts are referred to in the following description, and indicated in all the views of the drawings, by the same reference characters.

The numeral 1 designates the front portions of the side bars of the frame or chassis of an automobile or like mechanically propelled road machine. The axle 2 may be connected to the machine frame in any manner and is provided at its ends with spindles upon which the steering wheels 3 are mounted, said spindles being connected with the axle by means of the usual knuckles from which project arms 4. A rod 5 connects the arms 4 and is adapted to be connected with the steering mechanism by means of a rod 6.

The lamps 7 indicated by dotted lines in Fig. 1 are mounted upon brackets 8 which are secured to the upper ends of shafts 9 mounted in lamp bracket bearings 10, which are secured to the longitudinal bars 1 or other convenient portion of the chassis. The brackets 10 comprise base portions which are apertured to receive the fastenings and vertical portions in which latter the shafts 9 are mounted. As indicated most clearly in Fig. 5 each of the shafts 9 is formed near its upper end with an angular portion 11 and with threaded portions 12 and 13 upon opposite sides of the angular portion 11. The lower portion of each of the shafts is threaded, as indicated at 14. Ball bearings are provided at the upper and lower ends of the vertical portion of each lamp bracket bearing. A support 15 is threaded upon the lower portion 14 of each shaft and is secured thereto by means of a pin. A lock nut 16 is threaded upon the lower part 14 of the shaft. A cup 17 and cone 18 are mounted upon the lower portion of the shaft 9 and are fitted in a recess in the lower end of the vertical portion of the lamp bracket bearing 10. A helical spring 19 mounted in an enlarged portion of the opening formed vertically in the lamp bearing bracket exerts a downward pressure upon the shaft 9 through the parts mounted thereon. The spring 19 is of the expansible type and automatically compensates for wear, thereby preventing any rattle. Washers 20 and 21 are mounted upon the upper portion of the shaft 9 and are grooved to form a ball race in which balls are fitted. The lower washer 21 rests in a depression formed in the upper end of the lamp bearing bracket. The washer 20 is threaded upon the portion 13 of the shaft and may be adjusted to take up wear. An arm 22 is mounted upon the angular portion 11 of the shaft so as to turn with the latter and is provided at its inner end with a short arm 23 to which one end of a coil spring 24 is attached, the other end of the spring 24 being connected by means of a link 25 with the upright arm 26 of a bell crank, which is mounted at 27 upon one of the longitudinal bars 1. The bracket 8 is also mounted upon the angular portion 11 of the shaft 9 and is held in place by means of a nut 28 mounted upon the threaded portion 12.

A latch 29 is pivotally connected at its front end to the support 15 and has a projection 30, which is adapted to make interlocking connection with a projection 31 of the lamp bearing bracket 10, one of the projections, such as 31, being notched to receive the other projection 30. The notch 32 formed in the projection 31 is of wedge form and the projection 30 is of corresponding shape to fit within the notch by a wedging action, thereby preventing any lost motion and firmly fixing the position of the latch 29 when the same is elevated at its rear end. The latch 29 is provided near its forward or pivotal end with a pendent projection which terminates in a ball 33, which constitutes one member of a ball and socket joint.

A connection is provided between the latch 29 and the connecting rod 5 and in order to allow for variation in the distances between the latch and connecting rod 5 it is essential that the intermediate connection comprise telescoping parts. The telescoping connection consists of the parts 34 and 35, the latter being tubular and the former adapted to slide therein. The forward end of the tubular member 35 is provided with a socket 36, which receives the ball 33. The rear end of the part 34 terminates in a socket 37, which receives a coöperating ball connected with the rod 5. The ball and socket joints between the telescoping connection and the parts 5 and 29 admit of the telescoping connection readily adapting itself so as to prevent strain upon the connecting parts. The latch 29 when lowered is adapted to interlock with the telescoping connection and is provided at its outer or rear end with a U-shaped portion 38, which is adapted to embrace opposite sides of the telescoping connection, thereby causing the latch when lowered to move with the telescoping connection and effect a turning of the shaft 9 in its bearing. The latch 29 is pivotally connected to the support 15 so as to turn therewith horizontally while at the same time admitting of the latch having a pivotal movement in a vertical plane whereby its rear end may be engaged with or disengaged from the telescoping connection and its forward end interlocked with or released from the lamp bracket bearing. When the rear end of the latch 29 is elevated the telescoping connection may swing laterally with the connecting rod 5 without producing any turning movement of the shaft 9 in its bearing, but when the latch 29 is lowered into locked engagement with the telescoping connection the shaft 9 moves with said telescoping connection, thereby causing the headlights or lamps to turn with the steering wheels when the latter are moved to direct the machine in the required path of travel. A link 39 connects the latch 29 with the approximately horizontal member 40 of the bell crank.

In practice a rod 41 connects the upright member 26 of the bell crank with a foot lever, not shown, under control of the operator. The spring 24 normally exerts a pulling force upon the member 26 of the bell crank, thereby holding the latch 29 in engagement with the telescoping connection. By reason of the connections hereinbefore described operation of the steering mechanism causes a corresponding movement of the telescoping connection 34—35 and compels a turning of both shafts 9 in their bearings, with the result that both headlights are turned with the steering wheels in the direction of travel so as to illuminate the roadway in advance of the machine. It is to be understood that the shaft upon the opposite side of the machine from that provided with the latch and adjunctive parts has an arm 42 connected therewith and which arm is connected to the rear end of the arm 22 by means of a connection 43 comprising adjustable parts, whereby said connection may be lengthened or shortened as may be required in adapting the invention to the machine to be equipped with the mechanism. When it is required to lock the lamps against movement the rod 41 is moved to operate the bell crank and lift the rear end of the latch 29, thereby releasing the telescoping connection and causing the latch 29 to interlock with the lamp bracket bearing supporting said latch. Upon moving the steering wheels the telescoping connection 34—35 moves with the connecting rod 5 without producing any movement of the shafts 9 or lamps mounted thereon.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a lamp control of the character described, the combination of a lamp support, a latch mounted upon the lamp support, interlocking means between the latch and lamp support, a steering mechanism, connecting means between the steering mechanism and latch, interlocking means between the latch and said connecting means, and means for throwing the latch into or out of operative position.

2. In a lamp control the combination of a lamp bracket bearing, a shaft mounted in said lamp bracket bearing, a lamp connected with said shaft, a latch, a latch support connected with said shaft, steering mechanism and connecting means between the latch and steering mechanism, said latch being movable to throw the connecting means into or out of operative position.

3. In combination a lamp bracket bearing, a shaft mounted in said bearing and adapted to form a support for the lamp, a latch, a latch support mounted upon said shaft and having the latch pivotally connected thereto, interlocking means between the latch and lamp bearing bracket, steering mechanism, and connecting means between said latch and steering mechanism and having a ball and socket connection with the respective parts.

4. In an automobile lamp control the combination of a lamp bracket bearing, a shaft mounted therein and adapted to form a support for the lamp, a latch support connected with said shaft and movable therewith, a latch pivotally mounted upon the latch support, a steering mechanism, a telescoping connection between the steering mechanism and said latch, and interlocking means between the latch and said telescoping connection.

5. In combination a lamp bracket bearing, a shaft mounted in said bearing and forming a support for the lamp, a latch connected with said shaft, steering mechanism, connecting means between the steering mechanism and said latch, a bell crank, connecting means between one arm of the bell crank and latch, operating means connected with the other arms of the bell crank, and a spring normally exerting a force upon the bell crank to hold the latch in engagement with the connecting means between it and the steering mechanism.

In testimony whereof I affix my signature in presence of two witnesses.

WILFORD E. ANDERSEN.

Witnesses:
N. A. ANDERSON,
OLAUS AASA.